(12) United States Patent
Warganich

(10) Patent No.: US 7,234,618 B2
(45) Date of Patent: Jun. 26, 2007

(54) COLLAPSIBLE STORAGE CONTAINER FOR VEHICLES

(76) Inventor: Dan Warganich, 1080 Woodside La., Placerville, CA (US) 95667

( * ) Notice: Subject to any disclaimer, the term of this patent is extended or adjusted under 35 U.S.C. 154(b) by 302 days.

(21) Appl. No.: 10/832,669

(22) Filed: Apr. 27, 2004

(65) Prior Publication Data

US 2005/0242138 A1 Nov. 3, 2005

(51) Int. Cl.
  *B60R 7/00* (2006.01)
  *B60R 9/00* (2006.01)
(52) U.S. Cl. ............... 224/404; 224/403; 224/497
(58) Field of Classification Search ........... 224/403, 224/497, 404
  See application file for complete search history.

(56) References Cited

U.S. PATENT DOCUMENTS

| | | | | |
|---|---|---|---|---|
| 4,749,226 A | * | 6/1988 | Heft | 296/37.6 |
| 5,765,504 A | * | 6/1998 | Evans et al. | 119/168 |
| 6,354,682 B1 | * | 3/2002 | Nott et al. | 312/248 |
| 6,401,995 B1 | * | 6/2002 | Yuille et al. | 224/404 |
| 6,471,278 B2 | * | 10/2002 | Leitner et al. | 296/37.6 |
| RE37,924 E | * | 12/2002 | Kellogg et al. | 220/9.2 |
| 6,536,826 B1 | * | 3/2003 | Reed | 296/37.5 |
| 2002/0145022 A1 | * | 10/2002 | Nguyen et al. | 224/539 |
| 2005/0062309 A1 | * | 3/2005 | Juzwiak et al. | 296/51 |

* cited by examiner

*Primary Examiner*—Jes F. Pascua
*Assistant Examiner*—Lester L. Vanterpool
(74) *Attorney, Agent, or Firm*—Thomas R. Lampe

(57) ABSTRACT

A collapsible storage container is connected to upwardly extending vehicle structure adjacent to a vehicle support bed. The storage container incorporates interconnected components which facilitate changing the storage container between a non-collapsed configuration and collapsed configuration.

7 Claims, 4 Drawing Sheets

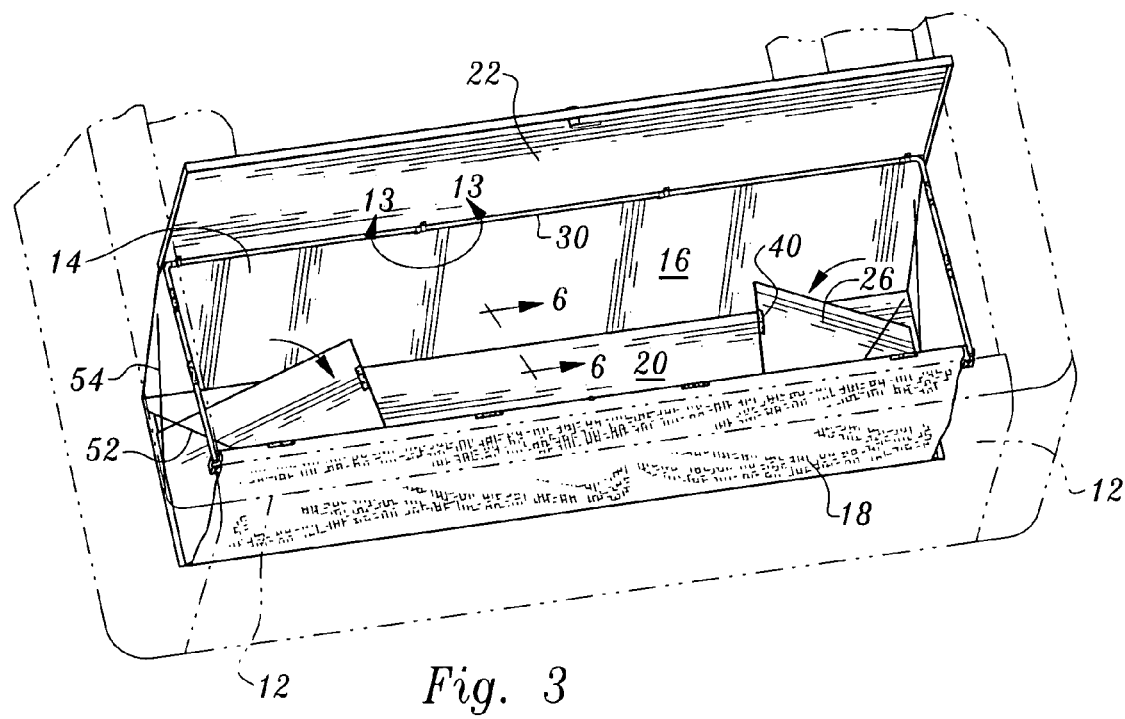
Fig. 3
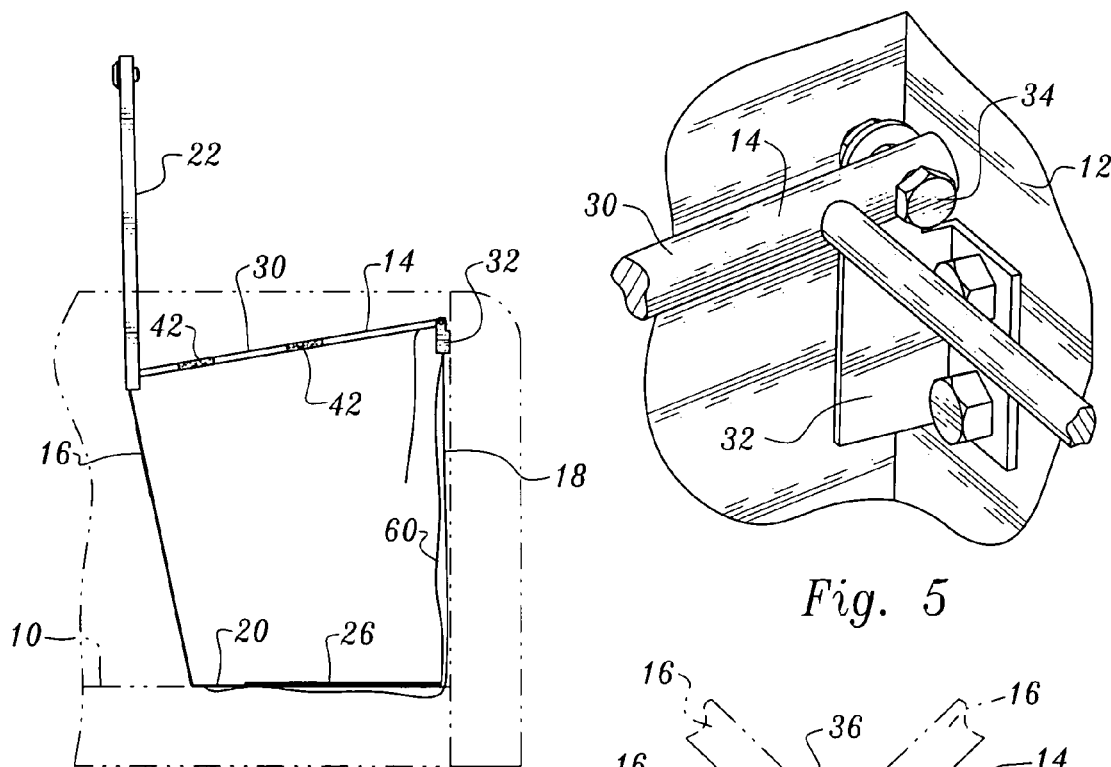
Fig. 4
Fig. 5
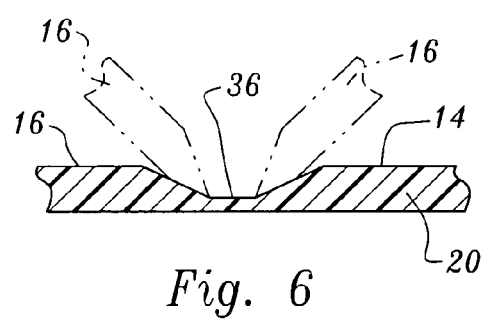
Fig. 6

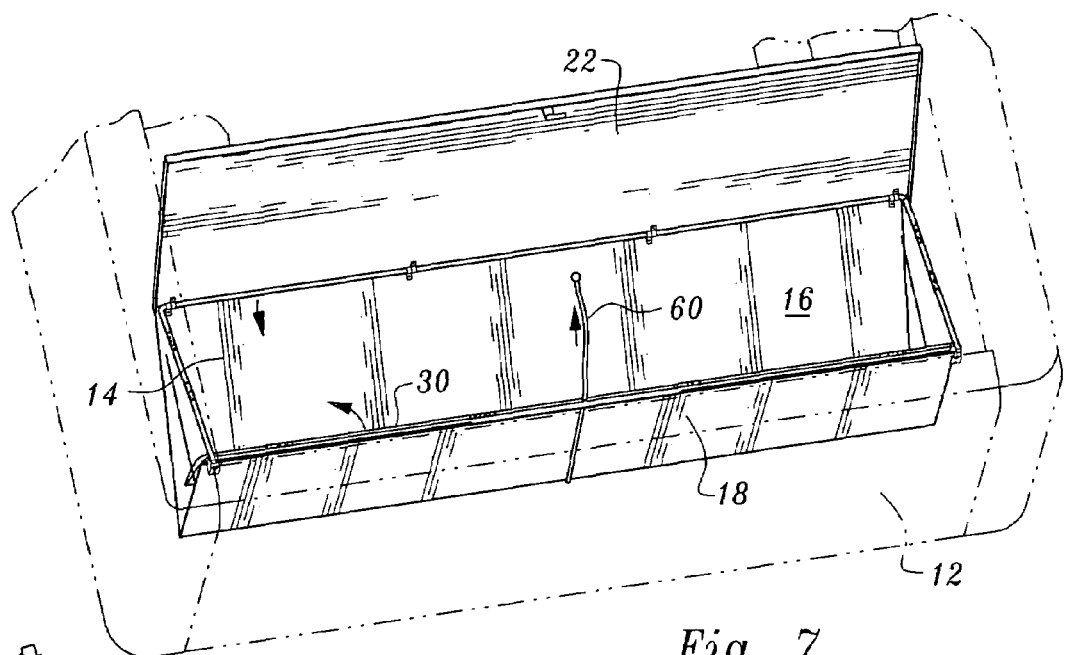
Fig. 7
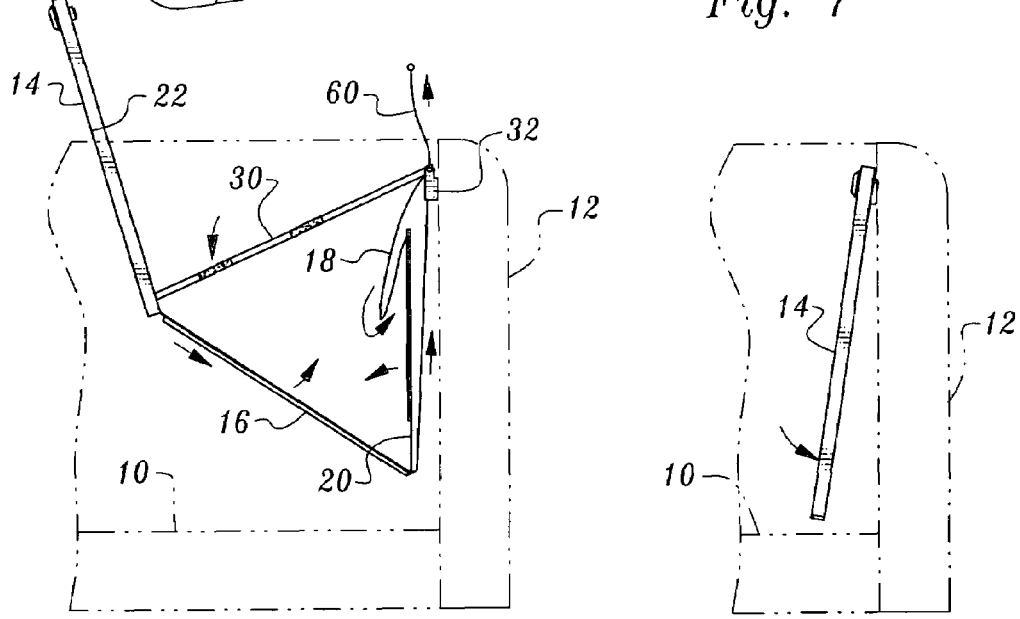
Fig. 8
Fig. 9
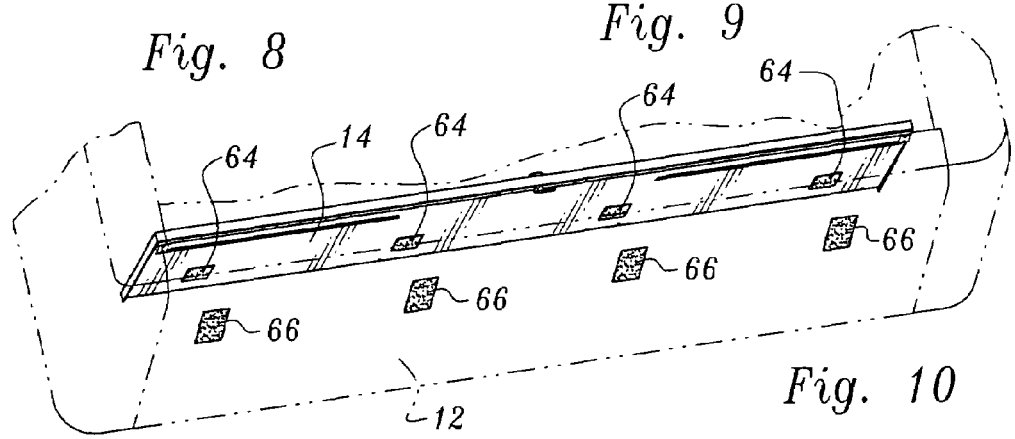
Fig. 10

COLLAPSIBLE STORAGE CONTAINER FOR VEHICLES

TECHNICAL FIELD

This invention relates to a storage box for use in storing groceries, tools or other objects in a pick-up truck or other vehicle having a support bed and structure including a tail gate extending upwardly from the support bed.

BACKGROUND OF THE INVENTION

It is well known to position storage boxes for holding tools and other objects on or over the bed of a pick-up truck. Often these containers or boxes are quite large and occupy considerable space whether in use for storage or empty. Quite often, the storage containers are secured in place. These storage containers or boxes can be quite heavy and unwieldy, making the tasks of installing or removing the boxes from trucks difficult ones.

DISCLOSURE OF INVENTION

The present invention is directed to a storage container utilized with a pick-up truck or other vehicle having a support bed and vehicle structure, such as a tail gate, extending upwardly from the support bed which can readily be reconfigured between a non-collapsed configuration wherein the storage container defines a storage container interior for storing groceries, tools and/or other objects and a collapsed configuration wherein the storage container is compact.

Primary connector structure is provided for connecting the storage container to the vehicle structure. The storage container when in the non-collapsed configuration and connected to the vehicle structure by the primary connector structure projects forwardly from the vehicle structure and is positioned on the support bed to define the storage container interior.

The storage container incorporates a plurality of structural components which are interconnected and relatively movable with respect to one another when the storage container moves between the non-collapsed configuration and the collapsed configuration.

Transformation of the storage container between collapsed and non-collapsed configurations is accomplished quickly and simply. When in its collapsed configuration the storage container takes up very little space. Thus, the user may either leave it on the pick-up truck or other vehicle or remove it temporarily with a minimum of effort. The storage container is of light-weight construction and is weatherproof and secure.

Other features, advantages and objects of the present invention will become apparent with reference to the following description and accompanying drawings.

BRIEF DESCRIPTION OF DRAWINGS

FIG. 3 is a view similar to FIG. 2, but showing relative positions assumed by components of the storage container further along in the process of collapsing the container;

FIG. 4 is a side, elevational view of the storage container still further along in the collapsing process, the panels shown in face-to-face engagement with a bottom component of the storage container;

FIG. 5 is a greatly enlarged, perspective view illustrating a portion of a frame utilized in the storage container along with a bracket employed to connect the frame to the pick-up truck tail gate;

FIG. 6 is a greatly enlarged, sectional view taken along the line 6—6 of FIG. 3, and showing movement of two interconnected components of the storage container in alternative positions assumed about an interconnecting integral hinge;

FIG. 7 is a view similar to FIG. 3, but showing components of the storage container in a late stage of the collapsing process;

FIG. 8 is a view similar to FIG. 4, but with the illustrated components shown in even a later stage of the collapsing process;

FIG. 9 is a side, elevational view showing the storage container completely collapsed and being placed into face-to-face relationship with the tail gate;

FIG. 10 is a view similar to FIG. 7, but showing the collapsed storage container and tail gate in the relative positions shown in FIG. 9;

MODES FOR CARRYING OUT THE INVENTION

Referring now to FIGS. 1–13, a preferred embodiment of the invention is illustrated.

A conventional pick-up truck having a support bed 10 and support vehicle structure including side walls and a tail gate 12 extending upwardly from the support bed is shown in phantom. The tail gate is shown in solid lines in FIGS. 5 and 12.

Figure 1:
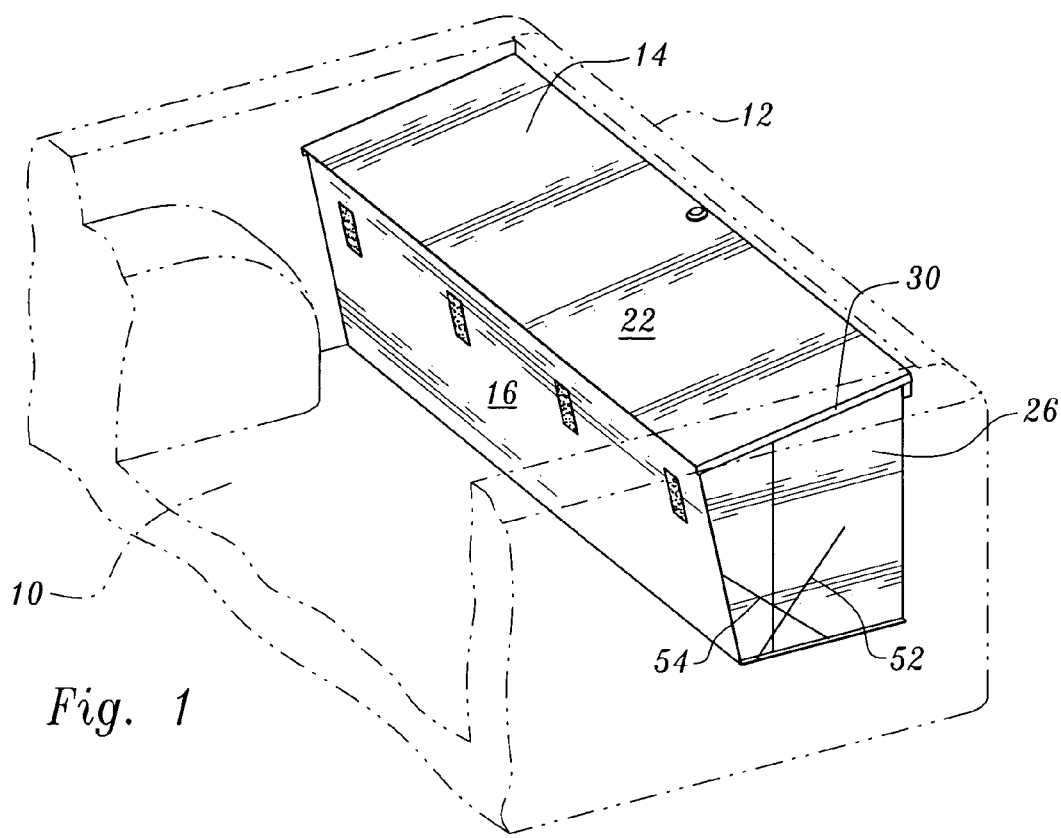
FIG. 1 is a frontal, perspective view of a storage container constructed in accordance with the teachings of the present invention positioned on the bed of a pick-up truck adjacent to the tail gate of the truck.
Figure 11:
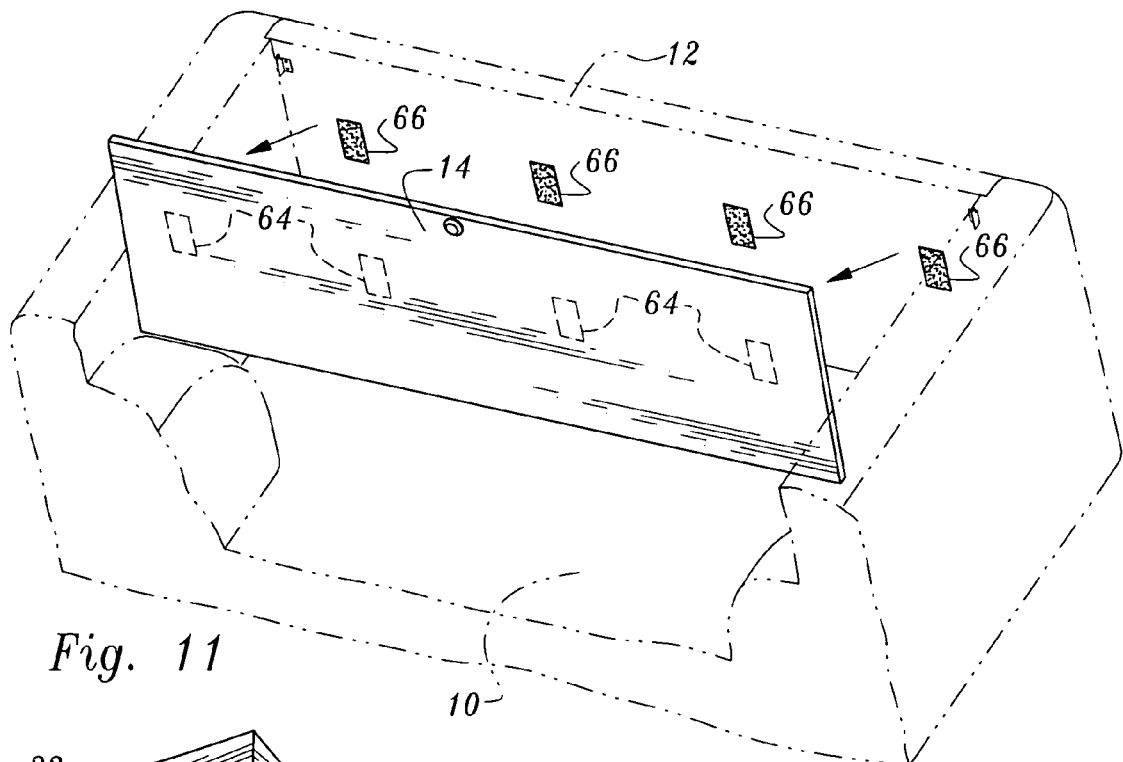
FIG. 11 is a front, perspective view illustrating the collapsed storage container completely removed from the tail gate.

Reference numeral 14 designates a storage container constructed in accordance with the teachings of the present invention. FIG. 1 shows the storage container 14 in its non-collapsed configuration wherein the storage container defines a storage container interior for storing tools or other objects. FIGS. 9, 10 and 11 show the storage container in its collapsed configuration, the storage container being compact. FIGS. 3, 4, 7 and 8 show the storage container in various configurations assumed thereby when being reconfigured from a non-collapsed configuration to a collapsed configuration.

Storage container 14 has a plurality of components, including storage container front wall component 16, storage container rear wall component 18, storage container bottom component 20, storage container top component 22, and storage container side wall components 24, 26 the latter being of identical construction but mirror images of one another.

The components just recited are interconnected and relatively movable with respect to one another when the storage container moves between the non-collapsed configuration and the collapsed configuration.

Figure 12:
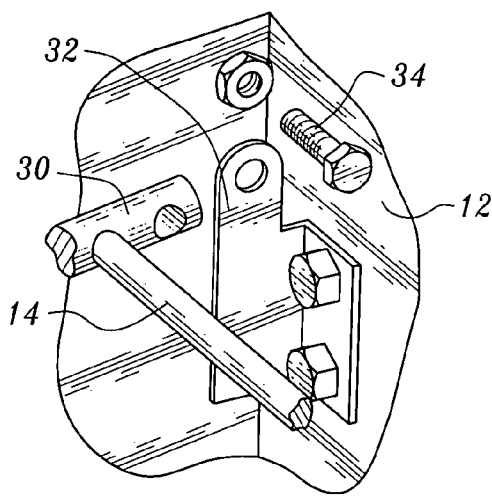
FIG. 12 is a view similar to FIG. 5, but illustrating the portion of the storage container frame disconnected from the tail gate bracket.

The storage container additionally includes a rectangular-shaped open frame 30 which is pivotally connected to the tail gate 12 by primary connector structure in the form of brackets 32 (only one of which is illustrated) at the ends of the tail gate. Frame 30 and the brackets have aligned holes receiving a bolt 34, the latter being cooperable with a nut to pivotally mount the frame in place on the tail gate. FIG. 5 shows the assembled structure, while FIG. 12 shows the frame separated from the bracket. It may be seen that the frame and bracket may readily be connected and disconnected as desired.

Figure 13:
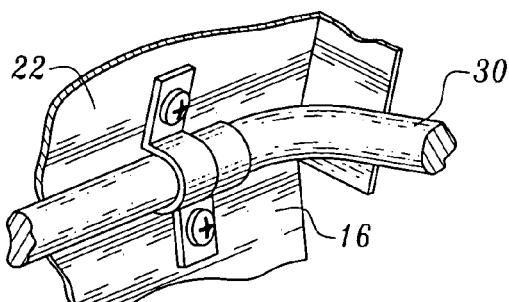
FIG. 13 is a greatly enlarged view showing that portion of the storage container delineated by double-headed arrow 13—13 in FIG. 3.

Storage container front wall component 16 and storage container rear wall component 18 are formed of any suitable flexible sheet material that is readily foldable and collapsible upon itself when the storage container moves from its non-collapsed configuration to its collapsed configuration. The upper ends of the front wall component and the rear wall component are connected to the frame so that they are supported thereby when the storage container is in its non-collapsed configuration. FIG. 13 shows a hinged connection between the rear wall component and the frame as well as between the top component 22 and the frame.

The top component 22 and bottom component 20 may be formed of any suitable rigid or semi-rigid material such as sheet metal or plastic. In the arrangement illustrated, the front wall component 16 and bottom component 20 are formed from plastic, being connected together by a live or integral hinge 36 as shown in FIG. 6, that figure also showing representative positions of the front wall component and bottom component when moved about the hinge.

Each side wall component 24, 26 comprises a panel of rigid material pivotally connected to opposed ends of the storage container bottom component. The panels 24, 26 may be selectively moved from a vertical orientation (shown in FIG. 1, for example) when the storage container is in its non-collapsed configuration to a horizontal orientation (shown for example in FIG. 4) wherein the panels are in face-to-face relationship with the storage container bottom component. This face-to-face relationship exists both preparatory to and after collapse of the storage container.

The side wall components 24, 26 extend between the storage container bottom component to the frame 30 when the storage container is in its non-collapsed configuration. In such an orientation, the side wall components extend between the storage container front wall component and the storage container rear wall component. Strips of synthetic hook and eye connector material 40 are located at the top ends of the side panels or side wall components 24, 26; likewise, cooperative strips of hook and eye connector material 42 are located at the sides of the frame 30. Connector strips 40, 42 maintain a connection between the side wall components or panels 24, 26 and frame to assist in maintaining the storage container in its non-collapsed configuration.

Figure 2:
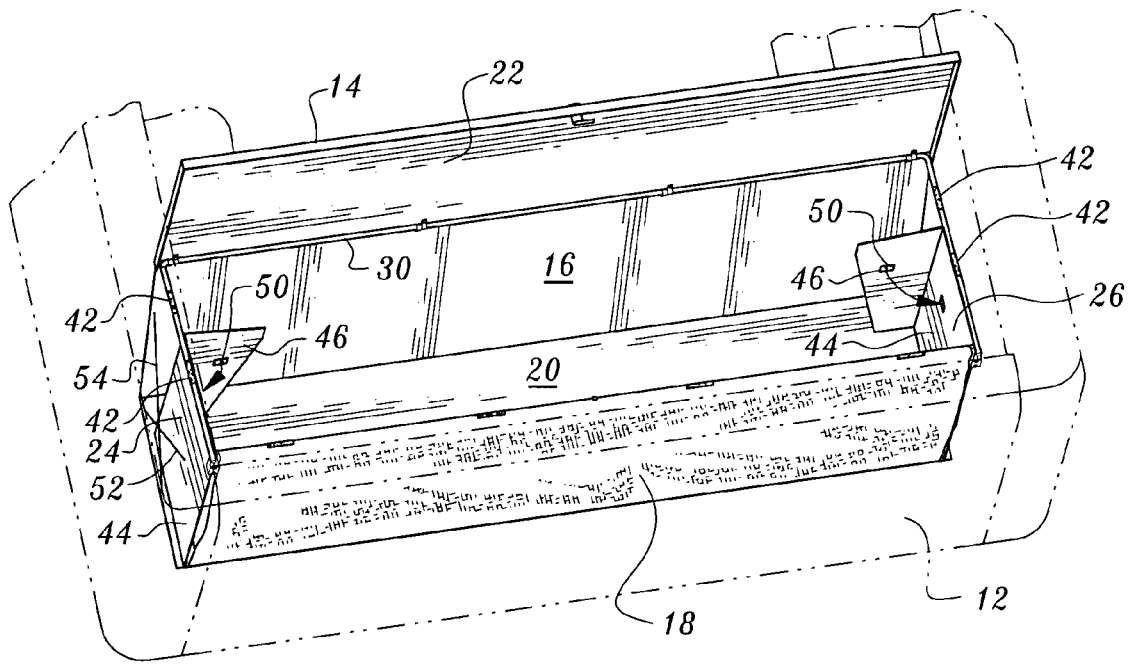
FIG. 2 is a rear, perspective view of the container with the storage container top component open and panels of the storage container in the process of being reconfigured prior to collapse of the storage container.

Each panel or side wall component 24, 26 is comprised of two pivotally interconnected panel segments 44 and 46. The panel segments of each panel are selectively positionable in a first condition (shown in FIG. 1, for example) wherein the panel segments are in alignment and a second condition wherein the panel segments are in face-to-face contact. FIG. 2 shows panel segments 46 being rotated and on their way to being placed in face-to-face engagement. Strips of synthetic hook and eye connector material such as strips 50 may be utilized to releasably maintain the panel segments in face-to-face condition.

An elongated resilient panel biasing member such as elastic cord 52 extends between each panel segment 44 and the frame 30 to continuously bias the panels toward their vertical orientation. In addition, elastic cords 54 extend between the storage container rear wall component 18 and the storage container bottom component 20 for continuously biasing these components toward one another.

Collapse of the storage box is accomplished by opening the top component or cover 22 as shown in FIG. 2.

Next, the panel segments 44, 46 are brought into face-to-face engagement by pivoting panel segments 46 as shown in FIG. 2.

FIG. 3 shows the next step in the collapse process. The panels (with panel segments 44, 46 in face-to-face engagement) are disconnected from the frame and pivoted into face-to-face engagement with the bottom component 22. This condition is shown in FIG. 4.

At this point the operator pulls upwardly on a draw string 60 which is attached to the bottom component 20 at a location spaced from hinge 36. This causes the bottom component to move upwardly as shown in FIG. 8, simultaneously collapsing and folding rear-wall component 18 as illustrated by the arrows. Continuous upward movement of the assembly by pulling on the draw string 60 will cause the bottom component 22 and attached side wall components 24, 26 to fall forward under the influence of gravity as shown by the arrow in FIG. 8 to engage front wall component 16.

Continued pulling will sandwich the bottom component 20 and side panels between the frame 30 and front wall component 16. The top component 22 is then pivoted relative to the frame to provide a compact module as shown in FIGS. 9, 10 and 11. A lock associated with top component 22 is employed to secure the storage container.

If desired, the frame may be disconnected from its associated brackets 32 and the collapsed storage container releasably held in place on the tail gate by supplemental connector structure in the form of synthetic hook and eye connector patches 64, 66 respectively on the collapsed storage container and the tail gate. FIG. 10 shows the collapsed storage container just prior to its connection to the tail gate and FIG. 11 shows this supplemental connector structure being disengaged. The storage container thus may either be retained on the pick-up truck or removed therefrom and used or stored elsewhere.

Figure 14:
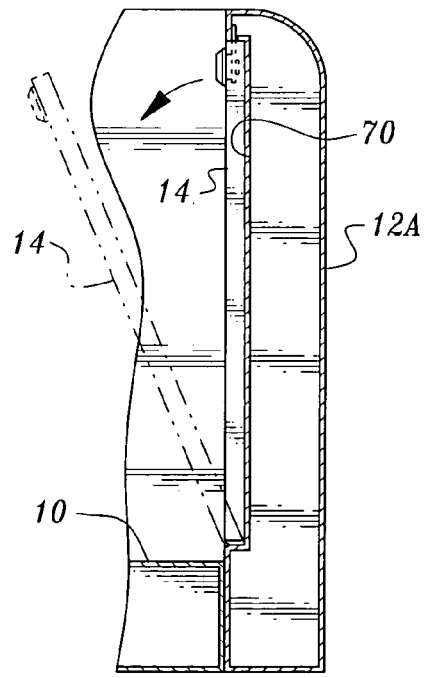
FIG. 14 illustrates an alternative embodiment of the invention wherein the collapsed storage container is housed in a recess formed in the tail gate.

FIG. 14 shows another embodiment of the invention wherein a tail gate 12A forms a recess 70 which may be utilized to accommodate the storage container 14 when collapsed and not in use.

The invention claimed is:

1. In combination:
a pick-up truck or other vehicle having a vehicle body including a support bed, side walls and a tail gate mounted for movement relative to said support bed between a substantially vertical position and a substantially horizontal position, said tail gate when in said substantially horizontal position projecting outwardly from said support bed;
a storage container selectively alternatively having a non-collapsed configuration wherein said storage container defines a storage container interior for storing tools, groceries or other objects and a collapsed configuration wherein said storage container is compact;

connector structure connecting said storage container to said tail gate, said storage container when in said non-collapsed configuration and connected by said connector structure to said tail gate when said tail gate is in said substantially vertical position projecting forwardly from said tail gate and positioned on the support bed to define said storage container interior, said storage container including a storage container front wall component, a storage container rear wall component, a storage container bottom component, a storage container top component, and spaced storage container side wall components, said components being interconnected and relatively movable with respect to one another when said storage container moves between said non-collapsed configuration and said collapsed configuration; and a frame pivotally connected to said tail gate by said connector structure and cooperable with said components to selectively maintain said storage container in said non-collapsed configuration, said frame movable between a first position wherein said frame projects outwardly away from said tail gate and a second position wherein said frame is substantially parallel to said tail gate, said frame when in said first position and when said tail gate is in said substantially vertical position supporting said storage front wall component and said storage rear wall component with said storage container bottom wall component covering a portion of said support bed and positioned thereon, said storage container side wall components extending upwardly from said storage container bottom wall component alongside said side walls of said vehicle and releasably connected to said frame to maintain said frame in said first position, and said storage container top component being pivotally connected to said frame and operable to alternatively open or close said storage container interior when said storage container is in said non-collapsed configuration and to cover at least a portion of said tail gate when said storage container is in said collapsed configuration with said storage container front wall component, said storage container rear wall component and said storage container side wall components disposed between said tail gate and said storage container top component.

2. The combination according to claim 1 wherein at least said storage container rear wall component is formed of flexible sheet material readily foldable and collapsible upon itself when said storage container moves from said non-collapsed configuration to said collapsed configuration.

3. The combination according to claim 2 wherein the flexible sheet material of at least said storage container rear wall component is maintained in taut condition when said storage container is in said non-collapsed configuration.

4. The combination according to claim 1 wherein said storage container side wall components extend between said storage container front wall component and said storage container rear wall component alongside said side walls when said storage container is in said non-collapsed configuration.

5. The combination according to claim 4 wherein said storage container side wall components comprise panels of rigid material pivotally connected to opposed ends of said storage container bottom component whereby said panels may be selectively moved from a vertical orientation when said storage container is in said non-collapsed configuration to a horizontal orientation wherein said panels are in face-to-face relationship with said storage container bottom component.

6. The combination according to claim 1 wherein said tail gate defines a tail gate recess accommodating the storage container when in said collapsed configuration.

7. The combination according to claim 1 additionally comprising a pull cord attached to said storage container within said storage container interior and extending outwardly therefrom manually utilized from a location external of said storage container interior to facilitate change of the storage container to said collapsed configuration from said non-collapsed configuration.

* * * * *